(12) United States Patent
Park et al.

(10) Patent No.: US 7,248,329 B2
(45) Date of Patent: Jul. 24, 2007

(54) LIQUID CRYSTAL DISPLAY DEVICE HAVING A PATTERNED SPACER AND METHOD OF FABRICATING THE SAME

(75) Inventors: Ku-Hyun Park, Gyeonggi-do (KR); Sang-Ho Choi, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/282,681

(22) Filed: Nov. 21, 2005

(65) Prior Publication Data
US 2006/0072062 A1 Apr. 6, 2006

Related U.S. Application Data

(62) Division of application No. 10/323,897, filed on Mar. 30, 2004.

(30) Foreign Application Priority Data

Apr. 16, 2002 (KR) ............................. 2002-20721
Mar. 30, 2004 (KR) ..................... 10-2004-021627

(51) Int. Cl.
*G02F 1/1337* (2006.01)
*G02F 1/1339* (2006.01)

(52) U.S. Cl. .................. 349/155; 349/156; 349/157; 349/123

(58) Field of Classification Search ........ 349/155–157, 349/123
See application file for complete search history.

(56) References Cited

U.S. PATENT DOCUMENTS

| | | | |
|---|---|---|---|
| 4,653,864 A | 3/1987 | Baron et al. ............... 350/344 |
| 6,335,780 B1 | 1/2002 | Kurihara et al. ............ 349/156 |
| 6,433,841 B1 * | 8/2002 | Murade et al. ............... 349/43 |
| 6,671,025 B1 * | 12/2003 | Ikeda et al. ................. 349/156 |
| 6,690,445 B2 * | 2/2004 | Matsumoto .................. 349/155 |
| 6,732,356 B1 | 5/2004 | Chen .......................... 717/156 |
| 6,762,818 B2 * | 7/2004 | Yamada ..................... 349/155 |
| 6,795,141 B2 | 9/2004 | Yamada ..................... 349/106 |
| 2001/0026347 A1 | 10/2001 | Sawasaki et al. ........... 349/156 |
| 2002/0005929 A1 * | 1/2002 | Imabayashi et al. ........ 349/155 |
| 2002/0060662 A1 * | 5/2002 | Hong ......................... 345/102 |
| 2002/0075443 A1 * | 6/2002 | Shimizu et al. ............. 349/155 |

\* cited by examiner

*Primary Examiner*—Andrew Schechter
*Assistant Examiner*—Hoan C. Nguyen
(74) *Attorney, Agent, or Firm*—Morgan, Lewis & Bockius LLP

(57) ABSTRACT

A liquid crystal display device includes first and second substrates facing each other and spaced apart by a uniform cell gap, an array element having a switching element on the first substrate and a first transparent electrode connected to the switching element, a first patterned spacer disposed on the array element having a first height less than the uniform cell gap, a second transparent electrode under the second substrate, a second patterned spacer disposed beneath the second transparent electrode, the second patterned spacer having a second height less than the uniform cell gap and connected to the first patterned spacer, a first alignment layer covering the first patterned spacer, a second alignment layer covering the second patterned spacer, and a liquid crystal material layer interposed between the first and second alignment layers, wherein the first and second spacers are connected to each other and a summation of the first and second heights of the first and second patterned spacers is equivalent to the uniform cell gap.

16 Claims, 9 Drawing Sheets

LIQUID CRYSTAL DISPLAY DEVICE HAVING A PATTERNED SPACER AND METHOD OF FABRICATING THE SAME

The present application is a Divisional of U.S. patent application Ser. No. 10/323,897 (now allowed) and claims the benefit of Korean Application No. P2004-021627 filed on Mar. 30, 2004, which is are both hereby incorporated by reference.

BACKGROUND OF THE INVENTION

1. Field of the Invention

The present invention relates to a liquid crystal display (LCD) device and method of fabricating the same, and more particularly, a liquid crystal display (LCD) device having a patterned spacer for keeping a cell gap and a method for fabricating the same.

2. Discussion of the Related Art

In general, liquid crystal display (LCD) devices have been developed for displaying images having low power consumption and portability characteristics. Currently, liquid crystal cells must be manufactured using LCDs for displaying images. The liquid crystal cells have array and color filter substrates and a liquid crystal material layer between the array and color filter substrates. Transparent electrodes are commonly formed on each of the array and color filter substrates to induce an electric field to the liquid crystal material layer by application of a voltage. An amount of transmitted light is controlled by the applied voltage, and images are displayed by a light shutter effect. An active matrix liquid crystal display device (AMLCD) that has a switching element at each pixel has been developed having superior resolution and an improved ability to display moving images. The liquid crystal display (LCD) device can be fabricated through an array substrate forming process, a color filter substrate forming process, and a liquid crystal cell forming process. Array elements, such as switching elements and pixel electrodes, are formed during the array substrate forming process, and color filters and common electrodes are formed during the color filter substrate forming process. The liquid crystal material is injected into a space between the array and color filter substrate during the liquid crystal cell forming process. The liquid crystal cell forming process is relatively simple compared to the array substrate and color filter forming processes. The liquid crystal cell forming process mainly comprises an alignment forming process, a cell gap forming process, a cell cutting process, and a liquid crystal material injection process. A liquid crystal display panel is completed by the liquid crystal cell forming process.

FIG. 1 is a cross sectional view of a liquid crystal display (LCD) device according to the related art. In FIG. 1, upper and lower substrates 10 and 30 are spaced apart from each other and a liquid crystal material layer 50 is interposed between the upper and lower substrates 10 and 30. A gate electrode 32 is formed on a transparent substrate 1 of the lower substrate 30, and a gate insulating layer 34 is formed on entire surface of the transparent substrate 1. A semiconductor layer 36 that has an active layer 36a and an ohmic contact layer 36b are sequentially formed over the gate electrode 32. Source and drain electrodes 38 and 40 are formed on the semiconductor layer 36, and a channel "ch" that exposes a portion of the active layer 36a is formed between the source and drain electrodes 38 and 40. The gate electrode 32, the semiconductor layer 36, the source electrode 38, the drain electrode 40, and the channel "ch" form a thin film transistor "T." A gate line (not shown), which is connected to the gate electrode 32, is formed along a horizontal direction, and a data line (not shown), which is connected to the source electrode 38, is formed along a vertical direction. The gate and data lines (not shown) cross each other to define a pixel region "P," and a passivation layer 42 that has a drain contact hole 44 is formed over the thin film transistor "T." A pixel electrode 48 that is connected to the drain electrode 40 through the drain contact hole 44 is formed within the pixel region "P." A color filter 14 is formed on a bottom surface of the upper substrate 10, and corresponds to the pixel electrode 48. A black matrix 12 is formed within a boundary region between neighboring sub-color filters to prevent light leakage and light infiltration into the thin film transistor "T." A common electrode 16 is formed beneath the color filter 14 for applying a voltage, and a seal pattern 52 is formed along edges of the lower substrate 30 to prevent the injected liquid crystal material from leaking. Ball spacers 54 are disposed between the upper and lower substrates 10 and 30 to maintain a uniform cell gap along with the seal pattern 52. An upper alignment film (not shown) and a lower alignment film (not shown) may further be formed between the common electrode 16 and the liquid crystal layer 50 and between the pixel electrode 48 and the liquid crystal layer 50, respectively. The ball spacers 54 are commonly formed of an elastic material, such as glass fiber and organic material, and are randomly disposed between the upper and lower substrates 10 and 30. However, alignment layer inferiority may occur due to movement of the ball spacers 54, and light leakage may occur around the ball spacers 54 due to an absorption power between the ball spacers 54 and liquid crystal molecules of the liquid crystal material layer 50 adjacent to the ball spacers 54. In addition, it is difficult to maintain a stable cell gap when the ball spacers 54 are applied to a large-sized liquid crystal display (LCD) device. Moreover, since the ball spacers 54 are electrically conductive and move around between the upper and lower substrates 10 and 30, a severe ripple phenomenon occurs when a screen is touched. Consequently, it is difficult to display high quality images in a liquid crystal display (LCD) device in which ball spacers are used for maintaining a uniform cell gap.

To overcome these problems related to ball spacers, patterned spacers formed at specific locations of the upper and lower substrates by a photolithographic process have been suggested. Accordingly, light leakage can be reduced and a uniform cell gap can be maintained since the patterned spacers are formed within non-pixel regions. In addition, the liquid crystal display (LCD) device can be manufactured to avoid the ripple phenomenon.

FIG. 2 is a cross sectional view of a liquid crystal display (LCD) device having a patterned spacer according to the related art. In FIG. 2, upper and lower substrates 60 and 70 are spaced apart from each other, and a thin film transistor "T" and pixel electrode 72 are formed of transparent conductive material on the lower substrate 70, and are electrically connected to the thin film transistor "T." A black matrix 62 is formed beneath the upper substrate 60 corresponding to the thin film transistor "T," and a color filter 64 is formed beneath the upper substrate 60 and the black matrix 62. A common electrode 66 is formed of a same material as that of the pixel electrode 72 beneath the color filter 64. A patterned spacer 74 is formed at a position between the black matrix 62 and the thin film transistor "T" to maintain a uniform cell gap between the upper and lower substrates 60 and 70. A liquid crystal material layer 80 is formed between the upper and lower substrates 60 and 70. In addition, upper and lower alignment layers (not shown) are formed between the common electrode 66 and the liquid crystal layer 80, and the pixel electrode 72 and the liquid crystal layer 80, respectively. The patterned spacer 74 is selectively formed only on one of the upper and lower substrates 60 and 70, thereby functioning to maintain a constant cell gap between the upper and lower substrates 60 and 70 after attaching the upper and lower substrates 60 and 70. A height of the patterned spacer 74 is proportional to the required uniform cell gap between the upper and lower substrates 60 and 70. However, as the height of the patterned spacer 74 increases, positional accuracy of the patterned spacer 74 is lowered during the photolithographic process for patterning the patterned spacer 74. Accordingly, a uniform cell gap is not maintained, and inferior rubbing areas increase.

FIG. 3 is a cross sectional view of a rubbing process on the patterned spacer of the liquid crystal display (LCD) device according to the related art. In FIG. 3, a patterned spacer 84 is formed on a substrate 82, and an alignment layer 86 is formed on the entire surface of the substrate 82. During a rubbing process, scratches are formed along a certain direction on a surface of the alignment layer 86. A region "II" of the alignment layer 86 around a base of the patterned spacer 84 is not rubbed, or is irregularly rubbed, thereby generating an inferior rubbing area "II." As a height "I" of the patterned spacer 84 increases, a width of the inferior rubbing area "II" increases proportionally to the height of the patterned spacer 84. For example, if the height of the patterned spacer 84 is 5 μm, a width of the inferior rubbing is approximately between 7 μm and 8 μm. Accordingly, since the inferior rubbing area "II" is to be covered with a black matrix (not shown) of an opposing substrate, an aperture ratio is decreased due to the additional amount of the black matrix (not shown). In addition, patterned spacers of a height over 5 μm is not proper for photolithographic processing.

SUMMARY OF THE INVENTION

Accordingly, the present invention is directed to a patterned spacer of a liquid crystal display (LCD) device that substantially obviates one or more of problems due to limitations and disadvantages of the related art.

An object of the present invention is to provide a liquid crystal display (LCD) device in which patterned spacers are formed on first and second substrates to secure an alignment stability of liquid crystal molecules by minimizing an inferior rubbing area and to increase aperture and contrast ratios by reducing an amount of black matrix.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates facing each other and spaced apart by a uniform cell gap, an array element having a switching element on the first substrate and a first transparent electrode connected to the switching element, a first patterned spacer disposed on the array element having a first height less than the uniform cell gap, a second transparent electrode under the second substrate, a second patterned spacer disposed beneath the second transparent electrode, the second patterned spacer having a second height less than the uniform cell gap and connected to the first patterned spacer, a first alignment layer covering the first patterned spacer, a second alignment layer covering the second patterned spacer, and a liquid crystal material layer interposed between the first and second alignment layers, wherein the first and second spacers are connected to each other and a summation of the first and second heights of the first and second patterned spacers is equivalent to the uniform cell gap.

In another aspect, a method of fabricating a liquid crystal display device includes forming an array element having a switching element on a first substrate, forming a first transparent electrode connected to the switching element, forming a first patterned spacer on the array element to have a first height less than a uniform cell gap, forming a first alignment layer to cover the first patterned spacer, forming a second transparent electrode on a second substrate, forming a second patterned spacer on the second transparent electrode to have a second height, forming a second alignment layer to cover the second patterned spacer, bonding the first and second substrates together to be spaced apart by the uniform cell gap, and forming a liquid crystal material layer interposed between the first and second alignment layers to fill the uniform cell gap, wherein the first and second spacers are connected to each other and a summation of the first and second heights of the first and second patterned spacers is equivalent to the uniform cell gap.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the illustrated embodiment of the present invention, which is illustrated in the accompanying drawings.

Figure 1:
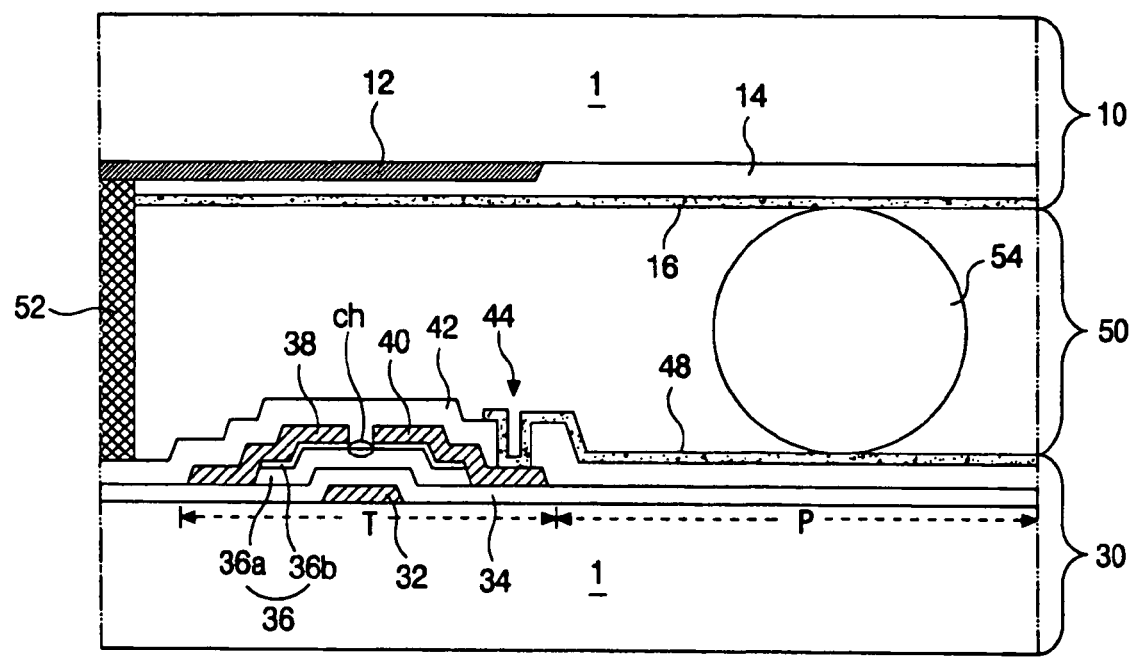
FIG. 1 is a cross sectional view of a liquid crystal display (LCD) device according to the related art.
Figure 2:
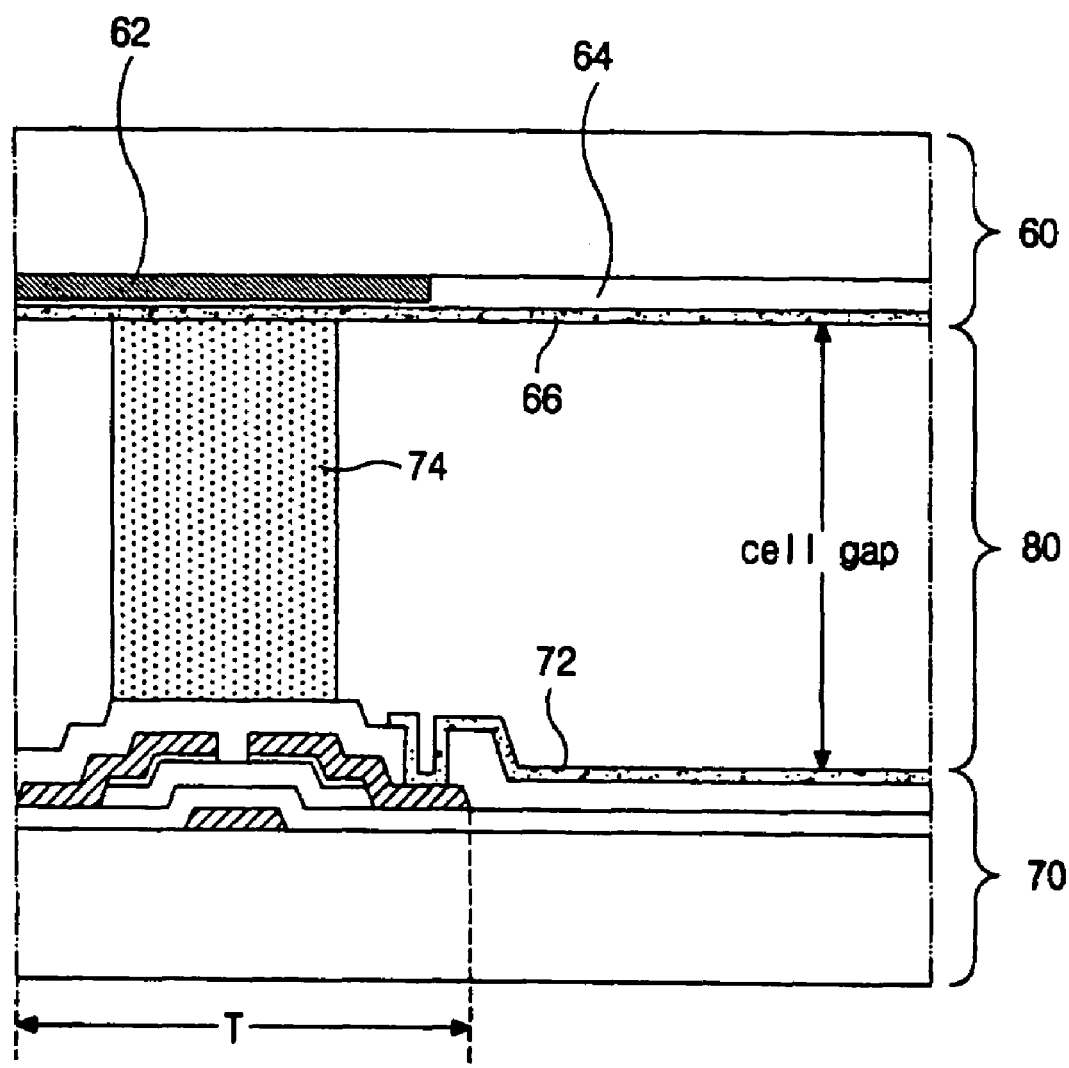
FIG. 2 is a cross sectional view of a liquid crystal display (LCD) device having a patterned spacer according to the related art.
Figure 3:
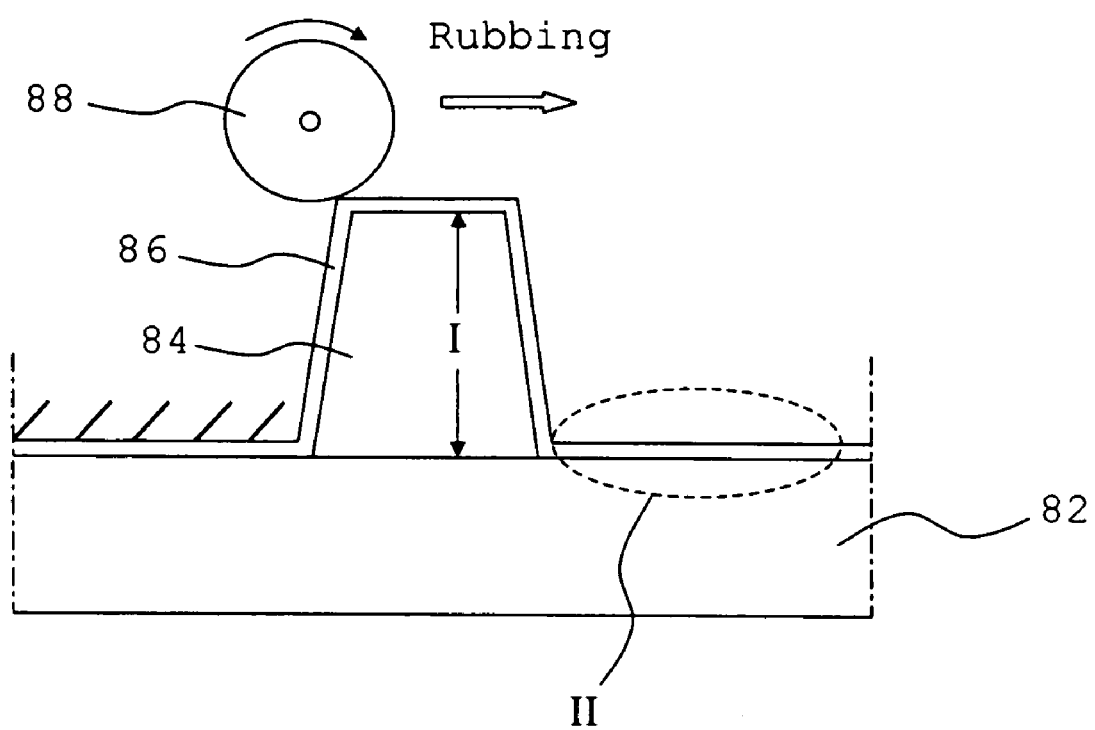
FIG. 3 is a cross sectional view of a rubbing process on the patterned spacer of the liquid crystal display (LCD) device according to the related art.
Figure 4:
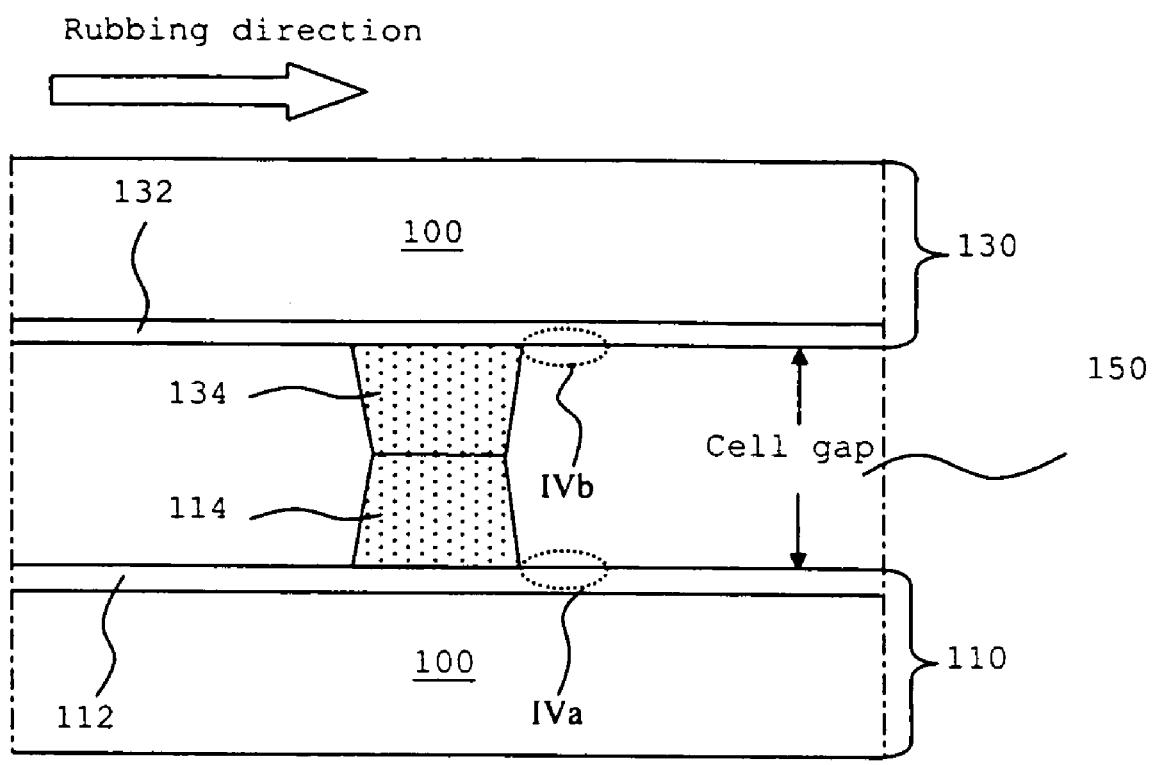
FIG. 4 is a cross sectional view of an exemplary liquid crystal display (LCD) device having a patterned spacer according to the present invention.

FIG. 4 is a cross sectional view of an exemplary liquid crystal display (LCD) device having a patterned spacer according to the present invention. In FIG. 4, first and second substrates 110 and 130 may be spaced apart from each other, wherein a first transparent electrode 112 may be formed on a transparent substrate 100 of the first substrate 110, and a second transparent electrode 132 may be formed beneath a transparent substrate 100 of the second substrate 130. First and second patterned spacers 114 and 134 may be formed between the first and second transparent electrode 112 and 132, and a top surface of the first patterned spacer 114 may contact a top surface of the second patterned spacer 134. Accordingly, the first and second patterned spacers 114 and 134 form a uniform cell gap that may be equivalent to a summation of individual heights of the first and second patterned spacers 114 and 134. A liquid crystal material layer 150 may be formed within a region of the uniform cell gap between the first and second substrate 110 and 130. If rubbing directions of the first and second substrates 110 and 130 are the same or similar, first and second inferior rubbing areas "IVa" and "IVb" corresponding to the first and second patterned spacers 114 and 134 may be formed. Accordingly, the individual heights of both the first and second patterned spacers 114 and 134 may be reduced, thereby reducing an area of the first and second inferior rubbing areas "IVa" and "Ivb," and increasing aperture and contrast ratios. Although not shown, the first transparent electrode 112 may be connected to a thin film transistor, and color filter and black matrix layers may be formed between the transparent substrate 100 of the second substrate 130 and the second transparent electrode 132. In addition, the first and second patterned spacers 114 and 134 may be formed by a photolithographic process using a photoresist material.

Figure 5A:
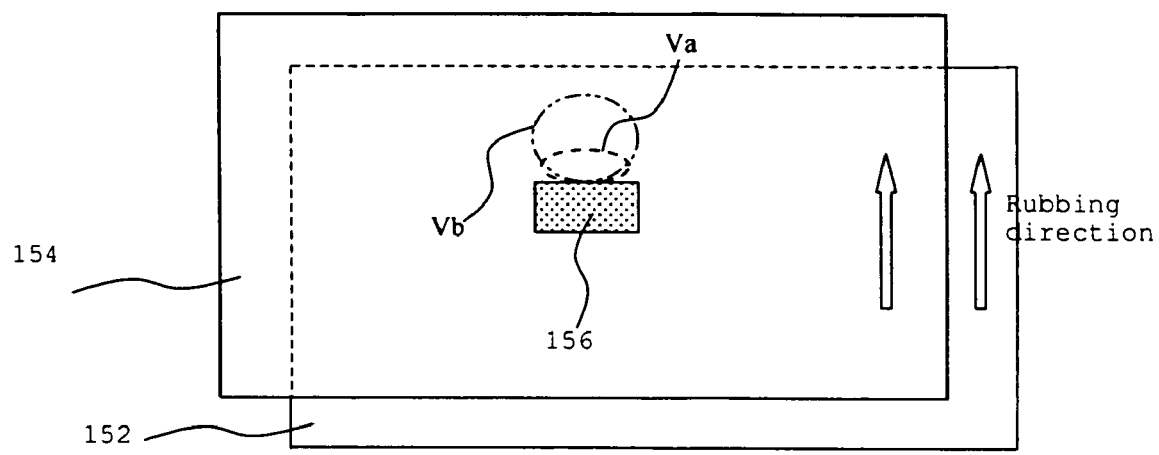
FIG. 5A is a plan view of a liquid crystal display (LCD) device having patterned spacers according to the present invention, and illustrates formation of inferior rubbing areas when first and second substrates are rubbed along a same direction.

FIG. 5A is a plan view of a liquid crystal display (LCD) device having patterned spacers according to the present invention, and illustrates formation of inferior rubbing areas when first and second substrates are rubbed along a same direction. In FIG. 5A, an inferior rubbing area "Va" that is formed around a base of a patterned spacer 156 may be reduced when first and second substrates 152 and 154 are rubbed along a same or similar directions. However, the inferior rubbing area "Va" may increase to another inferior rubbing area "Vb" as a height of the patterned spacer 156 increases. In addition, since the spacer is formed on both the first and second substrates 152 and 154, heights of individual patterned spacers on each of the first and second substrates 152 and 154 may be about one-half a total distance between the first and second substrates 152 and 154. Accordingly, since the inferior rubbing area "Va" is dependent upon the total height of the individual patterned spacers, the inferior rubbing area "Va" may decrease by reducing the height of one of the patterned spacers of one of the first and second substrates 152 and 154.

Figure 5B:
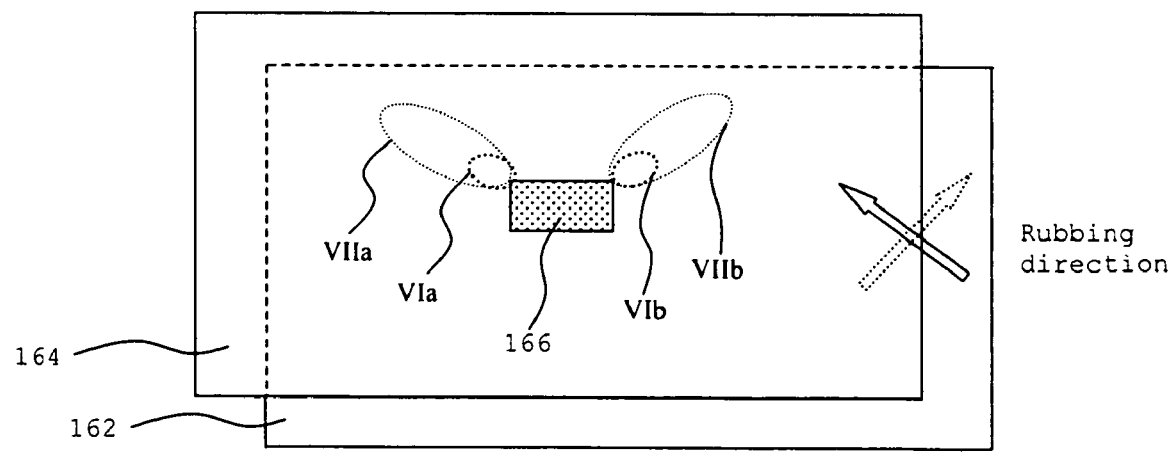
FIG. 5B is a plan view of a liquid crystal display (LCD) device having patterned spacer according to the present invention, and illustrates formation of inferior rubbing areas when a first substrate is rubbed along a direction perpendicular to a rubbing direction of a second substrate.

FIG. 5B is a plan view of a liquid crystal display (LCD) device having patterned spacers according to the present invention, and illustrates formation of inferior rubbing areas when a first substrate 162 is rubbed along a direction perpendicular to a rubbing direction of a second substrate 164. Accordingly, first and second inferior rubbing areas "VIIa" and "VIIb" may decrease to third and fourth rubbing areas "VIa" and "VIb" by effectively reducing a height of each individual patterned spacer when rubbing directions of the first and second substrates 162 and 164 are not along a same or similar directions.

Figure 6:
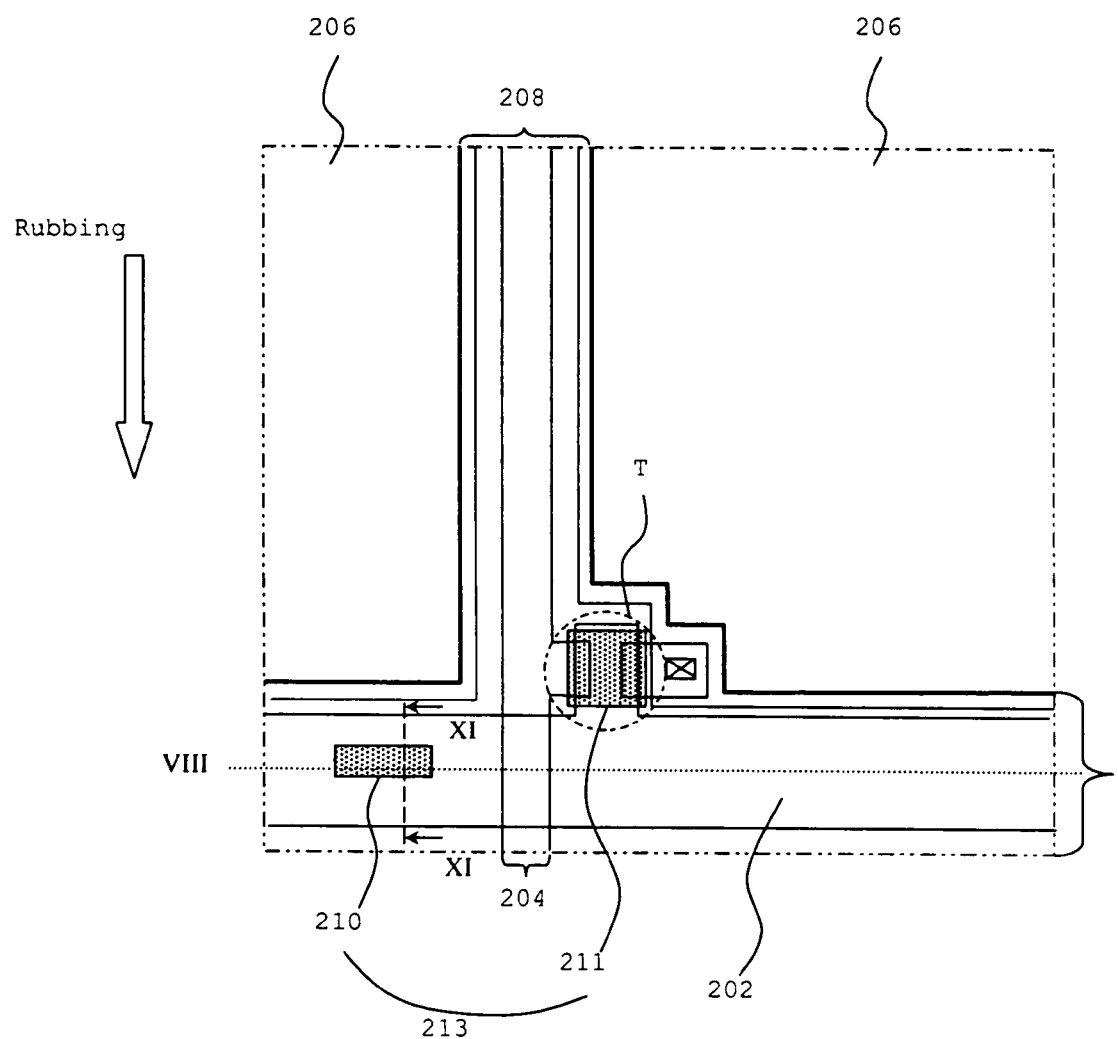
FIG. 6 is a partial plan view of an exemplary liquid crystal display (LCD) device having patterned spacers according to the present invention.

FIG. 6 is a partial plan view of an exemplary liquid crystal display (LCD) device having patterned spacers according to the present invention. In FIG. 6, a gate line 202 may be formed along a first direction, and a data line 204 may be formed along a second direction perpendicular to the first direction. A thin film transistor "T" may be formed at a region where the gate and data lines 202 and 204 cross each other, and a pixel electrode 206 may be formed within a pixel region and connected to the thin film transistor "T." Although not shown, edge portions of the pixel electrode 206 and a space between the pixel electrode 206 and the thin film transistor "T" may be covered with a black matrix layer of an opposing substrate that corresponds to a black matrix region 208. Accordingly, since a width of the gate line 202 may be larger than a width of the data line 204 to prevent a delay of a gate signal voltage, a patterned spacer 213 may be formed within the black matrix region 208.

The patterned spacer 213 may be formed in a way such that first and second patterned spacers 210 and 211 may be formed over the gate line 202 and the thin film transistor "T," respectively. If a rubbing process is performed along a direction from an upper portion of a substrate (i.e., top of page) to a lower portion of the substrate (i.e., bottom of page), then the first patterned spacer 210 disposed over the gate line 202 may be formed such that a longitudinal centerline of the first patterned spacer 210 is offset from a longitudinal centerline "VIII" of the gate line 202. On the other hand, the patterned spacers 213 may be formed over one of the gate line 202 and the thin film transistor "T." Alternatively, the patterned spacer 213 may be formed only over the gate line 202 rather than over the thin film transistor "T." Although not shown in FIG. 6, the patterned spacer 213 may include an upper patterned spacer portion formed on an upper substrate and a lower patterned spacer portion formed on a lower substrate, whereby a uniform cell gap may be created by a summation of the individual heights of the upper and lower patterned spacer portions. Accordingly, if the height of the lower patterned spacer portion is between 80% and 90% of the uniform cell gap, then the height of the upper patterned spacer portion may be between 10% and 20% of the uniform cell gap. In addition, the upper patterned spacer portion may have a width larger than a width of the lower patterned spacer portion, thereby compensating for any assembling margin of upper and lower substrates.

Figure 7A:
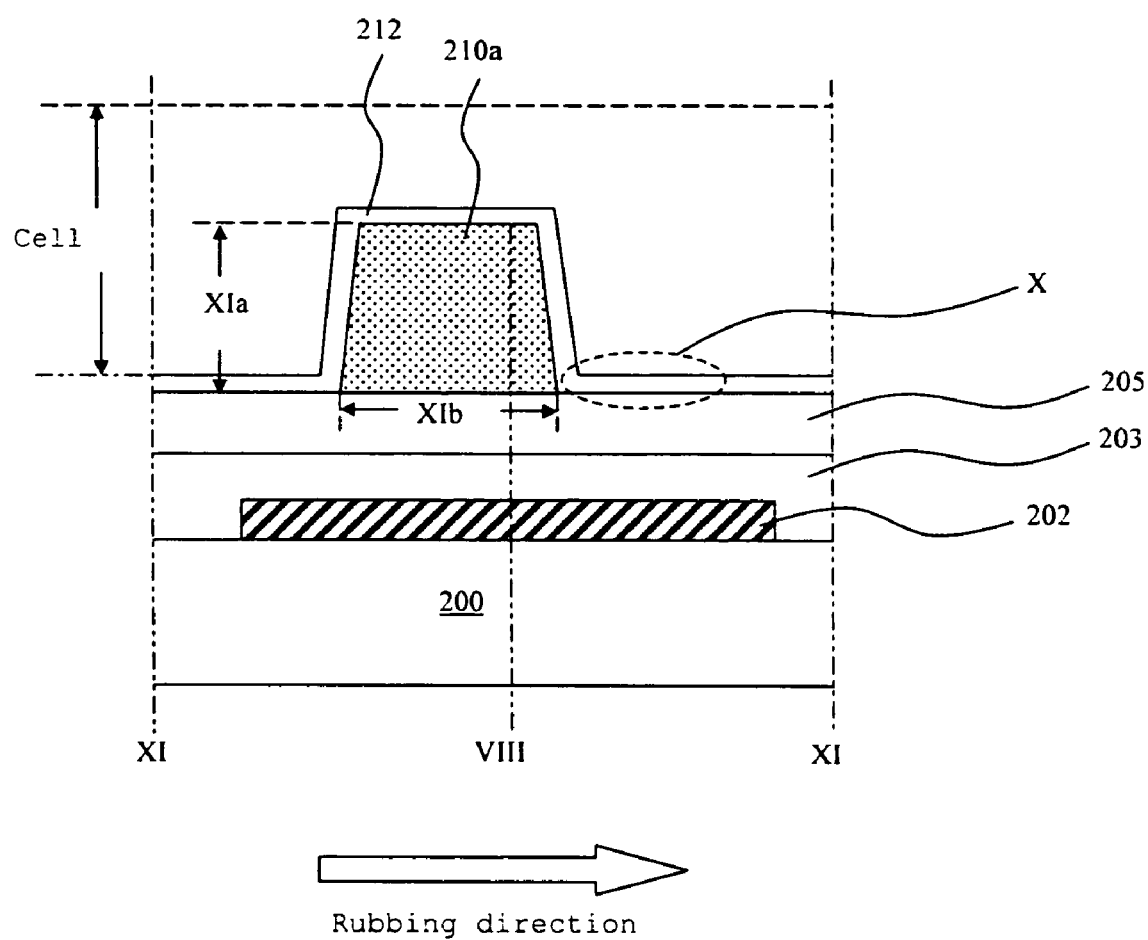
FIG. 7A is a cross sectional view of an exemplary first substrate taken along IX-IX of the liquid crystal display (LCD) device of FIG. 6 according to the present invention.

FIG. 7A is a cross sectional view of an exemplary first substrate taken along IX-IX of the liquid crystal display (LCD) device of FIG. 6 according to the present invention. In FIG. 7A, the gate line 202 may be formed on a transparent substrate 200, and a gate insulating layer 203 may be formed on an entire surface of the transparent substrate 200. A passivation layer 205 may be formed to cover the thin film transistor "T" (in FIG. 6) on the gate insulating layer 203. The first lower patterned spacer 210a may be formed on the passivation layer 205 to overlap the gate line 202, and a lower alignment layer 212 may be formed on entire surface of the transparent substrate 200. If the lower alignment layer 212 is rubbed along a lateral direction (i.e., from a left side of the page to a right side of the page), an inferior rubbing area "X" may be formed at a trailing edge of the first lower patterned spacer 210a (i.e., right side of the spacer). Accordingly, the first lower patterned spacer 210 may be formed laterally offset from the centerline "VIII" of the gate line 202. Thus, the inferior rubbing area "X" may be adequately covered by a black matrix layer (not shown) overlapping the gate line 202. In addition, a summation of a height "XIa" of the first lower patterned spacer 210a and a height of a first upper patterned spacer (not shown) may be equivalent to the uniform cell gap of the liquid crystal display (LCD) device. For example, the height of the first lower patterned spacer "XIa" may be between 80% and 90% of the uniform cell gap, and the first upper patterned spacer (not shown) may be between 20% and 10% of the uniform cell gap.

Figure 7B:
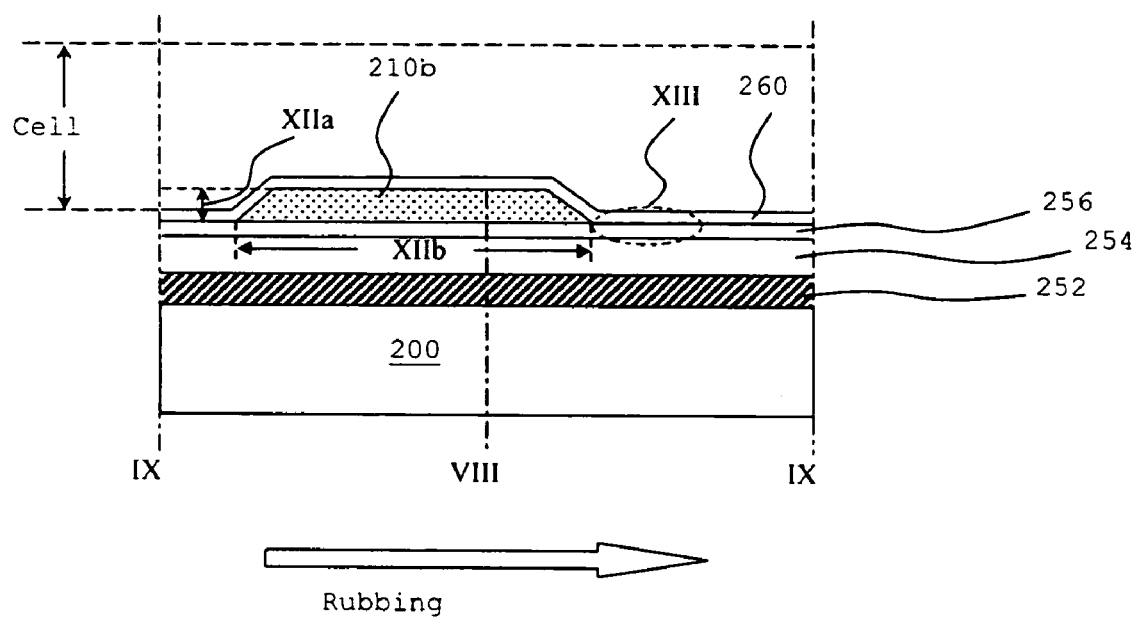
FIG. 7B is a cross sectional view of an exemplary second substrate taken along IX-IX of the liquid crystal display (LCD) device of FIG. 6 according to the present invention.

FIG. 7B is a cross sectional view of an exemplary second substrate taken along IX-IX of the liquid crystal display (LCD) device of FIG. 6 according to the present invention. In FIG. 7B, a black matrix layer 252 and a color filter layer 254 may be sequentially formed on a transparent substrate 200, and a common electrode 256 may be formed on the color filter layer 254. The first upper patterned spacer 210b having a height "XIIb" may be formed on the common electrode 256, and an upper alignment layer 260 may be formed on an entire surface of the transparent substrate 200. Accordingly, if the upper alignment layer 260 is rubbed along a lateral direction (i.e., from a left side of the page to a right side of the page), then an inferior rubbing area "XIII" may be formed in a trailing edge (i.e., right side) of the first upper patterned spacer 210b. Thus, the first upper patterned spacer 210b may be formed laterally offset from the centerline "VIII" of the gate line 202. In addition, the height "XIIa" of the first upper patterned spacer 210b may be between 10% and 20% of the uniform cell gap since the height "XIa" of the first lower patterned spacer 210a (in FIG. 7A) is between 80% and 90% of the uniform cell gap. A width "XIIb" of the first upper patterned spacer 210b may be larger than a width "XIb" of the first lower patterned spacer 210a (in FIG. 7A) when considering a possible assembling margin of about ±5 μm. In addition, the patterned spacers may be formed in a non-pixel region.

Figure 8:
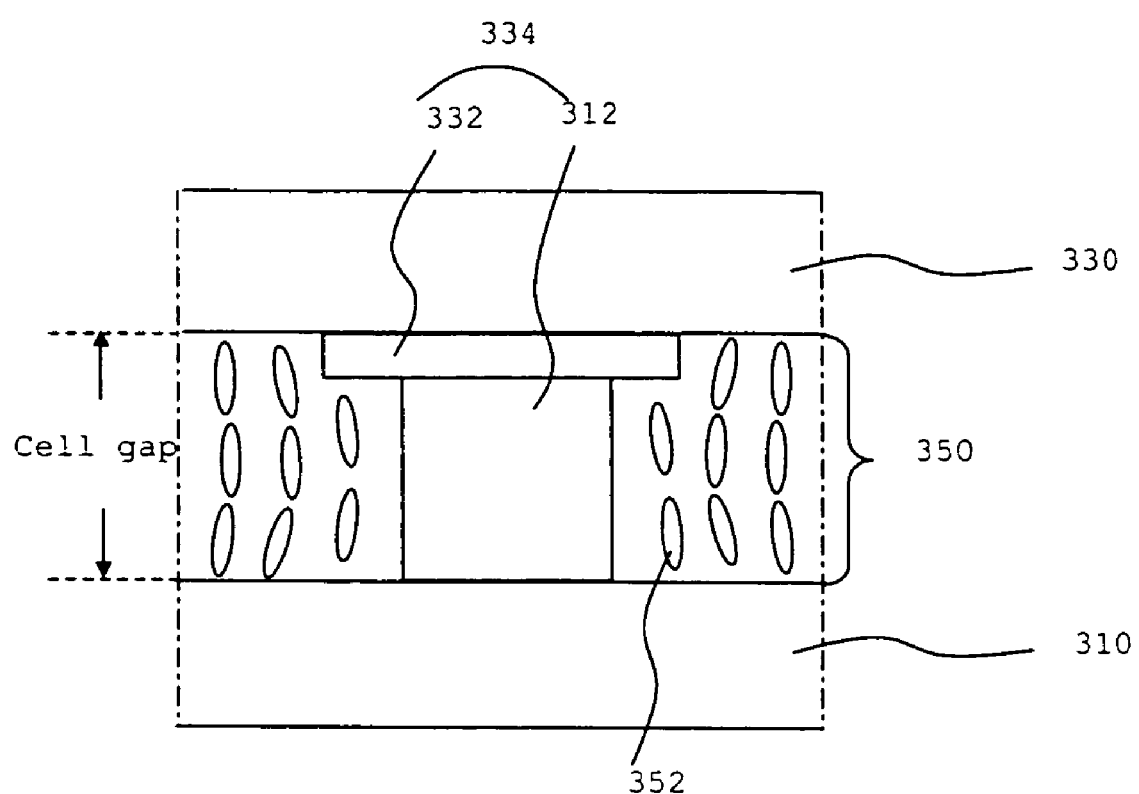
FIG. 8 is a cross sectional view of another exemplary liquid crystal display (LCD) device having patterned spacers according to the present invention, and illustrates alignment characteristics of liquid crystal molecules around the patterned spacers.

FIG. 8 is a cross sectional view of another exemplary liquid crystal display (LCD) device having patterned spacers according to the present invention, and illustrates alignment characteristics of liquid crystal molecules around the patterned spacers. In FIG. 8, first and second substrates 310 and 330 may be spaced apart from each other with a liquid crystal material layer 350 formed therebetween. A patterned spacer 334 that may be equivalent to a uniform cell gap may be formed between the first and second substrates 310 and 330. The patterned spacer 334 may include a first patterned spacer 312 disposed on the first substrate 310 and a second patterned spacer 332 disposed on the second substrate 330. Accordingly, the first and second patterned spacers 312 and 332 may contact each other such that a summation of the individual heights of the first and second patterned spacers 312 and 322 may be equivalent to the uniform cell gap of a liquid crystal display (LCD) device. For example, a height of the first patterned spacer 312 may be between 80% and 90% of the uniform cell gap and a height of the second patterned spacer 332 may be between 10% and 20% of the uniform cell gap. In addition, a width of the second patterned spacer 332 may be larger than a width of the first patterned spacer 312. If the patterned spacer according to the present invention is applied to an optically compensated birefringence (OCB) mode liquid crystal display (LCD) device in which a response time and a light viewing angle is controlled using birefringence and orientation of the liquid crystal molecules having a bend structure when a voltage is applied to the liquid crystal molecules, liquid crystal molecules 350 adjacent to the patterned spacer 334 are more easily aligned vertically and a quick transition from a splay orientation to a bend orientation is possible with a low voltage. The OCB mode liquid crystal display (LCD) device may have a high cell gap between about 5 μm and about 6 μm to prevent a delay of a phase difference. If the patterned spacer according to the present invention is applied to the liquid crystal display (LCD) device having a relatively large cell gap, such as the OCB mode liquid crystal display (LCD) device, a height of the patterned spacer disposed on one substrate may be reduced such that deviation of the height of the patterned spacer may be reduced during photolithographic processing using a photoresist material. Accordingly, a flatness property of the patterned spacer may be improved and a uniform cell gap may be obtained. Moreover, any inferior rubbing area formed around a base of the patterned spacer may be minimize, and aperture and contrast ratios may be increased.

It will be apparent to those skilled in the art that various modifications and variations can be made in the liquid crystal display device having a patterned spacer and method of fabricating the same of the present invention without departing from the spirit or scope of the invention. Thus, it is intended that the present invention cover the modifications and variations of this invention provided they come within the scope of the appended claims and their equivalents.

What is claimed is:

1. A method of fabricating a liquid crystal display device, comprising steps of:
    forming an array element having a switching element on a first substrate;
    forming a first transparent electrode connected to the switching element;
    forming a first patterned spacer on the array element to have a first height less than a uniform cell gap;
    forming a first alignment layer to cover the first patterned spacer;
    forming a second transparent electrode on a second substrate;
    forming a second patterned spacer on the second transparent electrode to have a second height;
    forming a second alignment layer to cover the second patterned spacer;
    bonding the first and second substrates together to be spaced apart by the uniform cell gap; and
    forming a liquid crystal material layer interposed between the first and second alignment layers to fill the uniform cell gap,
    wherein the first and second spacers are connected to each other and a summation of the first and second heights of the first and second patterned spacers is equivalent to the uniform cell gap, and a first one of the first and second heights is between 80% and 90% of the uniform cell gap and a second one of the first and second heights is between 10% and 20% of the uniform cell gap.

2. The method according to claim 1, wherein the first and second substrates both have a pixel region and a non-pixel region, and the first and second patterned spacers are formed within the non-pixel regions of the first and second substrates.

3. The method according to claim 1, wherein the step of forming an array element includes a step of forming a gate line to extend along a first direction and forming a data line to extend along a second direction perpendicular to the first direction.

4. The method according to claim 3, wherein the step of forming a first patterned spacer is within an area overlapping the gate line.

5. The method according to claim 3, further including steps of rubbing the first and second alignment layers along the second direction.

6. The method according to claim 5, wherein the first patterned spacer is laterally offset from a longitudinal centerline of the gate line along a third direction opposite to the second direction.

7. The method according to claim 1, wherein the second substrate includes color filter layers on the second transparent electrode and a black matrix layer within a boundary region of two adjacent color filter layers.

8. The method according to claim 7, wherein the step of forming a second patterned spacer is within an area overlapping the black matrix layer.

9. The method according to claim 7, further including steps of rubbing the first and second alignment layers along a second direction parallel to a direction of a data line of the array element.

10. The method according to claim 9, wherein the first patterned spacer is laterally offset from a longitudinal centerline of the gate line along a third direction opposite to the second direction.

11. The method according to claim 1, wherein the second one of the first and second heights has a width larger than the first one of the first and second heights.

12. The method according to claim 1, wherein the uniform cell gap is between about 5 μm and about 6 μm.

13. The method according to claim 1, wherein the liquid crystal display device is an optically compensated birefringence mode liquid crystal display device.

14. The method according to claim 13, further including a step of rubbing the first and second alignment layers along similar directions.

15. The method according to claim 13, wherein an orientation of liquid crystal molecules of the liquid crystal material layer has a bend structure when a voltage is applied to the liquid crystal molecules.

16. The method according to claim 1, wherein the steps of forming first and second patterned spacers includes photolithographic processes using photoresist material.

* * * * *